United States Patent [19]
Weibel

[11] Patent Number: 6,052,906
[45] Date of Patent: Apr. 25, 2000

[54] NUTCRACKER

[75] Inventor: Hans Weibel, Schüpfen, Switzerland

[73] Assignee: Zyliss Haushaltwaren AG, Lyss, Switzerland

[21] Appl. No.: 09/236,075

[22] Filed: Jan. 25, 1999

[30] Foreign Application Priority Data

Jan. 27, 1998 [CH] Switzerland .............................. 0202/98
Jan. 30, 1998 [CH] Switzerland .............................. 0229/98

[51] Int. Cl.⁷ ...................................................... A47J 43/26
[52] U.S. Cl. ........................................ 30/120.3; 30/120.2
[58] Field of Search ............................... 30/120.1, 120.2, 30/120.3, 120.5; D7/680; 81/421

[56] References Cited

U.S. PATENT DOCUMENTS

| | | | |
|---|---|---|---|
| 1,134,265 | 4/1915 | Harper | 30/120.3 |
| 1,219,859 | 3/1917 | Paxton | 30/102.3 |
| 2,464,983 | 3/1949 | Lisbon | 30/120.3 |
| 2,550,197 | 4/1951 | Lisbon | 30/120.3 |
| 3,048,208 | 8/1962 | Umanoff | 30/120.3 |
| 3,148,718 | 9/1964 | Plott | 30/120.3 |
| 5,351,402 | 10/1994 | Mansfield | 30/120.3 |

FOREIGN PATENT DOCUMENTS

| | | | |
|---|---|---|---|
| 0 755 647 | 1/1997 | European Pat. Off. | |
| 769 670 | 8/1934 | France | |
| 975 797 | 3/1951 | France | |
| 735108 | 8/1955 | United Kingdom | 30/120.3 |

*Primary Examiner*—Hwei-Siu Payer
*Attorney, Agent, or Firm*—Oblon, Spivak, McClelland, Maier & Neustadt, P.C.

[57] ABSTRACT

The nutcracker has two handles which can be pivoted toward each other about a pin. The one handle is connected to a basket for receiving a nut. The other handle is designed as a pressing handle, its end region being constructed as the pressing part. An insert part can be inserted into this end region for opening small nuts. The basket is provided with an aperture through which the end region of the pressing handle can run directly into the basket. A good squeezing result (opening of the nut) can be achieved. The rear basket wall is preferably closed off in order to prevent the nut from falling out when being placed in. The spacing between the pressing part and the basket wall is selected in such a way that a crushing of the nut is not possible.

8 Claims, 5 Drawing Sheets

NUTCRACKER

This invention concerns a nutcracker with two handles which can be pivoted toward one another. In conventional nutcrackers the nut has to be carefully placed. Moreover, conventional nutcrackers are not very suitable for cracking nuts of different sizes. It is the object of the present invention to avoid the drawbacks of the state of the art, and to create a nutcracker in which the nut is automatically placed correctly. When opening the nut, the nut should always be precisely pressed upon. The nutcracker should be able to be adjusted to the size of the nut to be cracked. This is achieved according to the invention in that the one handle is provided at its end with a receiving means for receiving a nut, and the receiving means is provided with an aperture in the end region of the other handle, acting as the pressing handle, through which aperture the pressing handle, with its end region acting as the pressing part, can run directly into the receiving means, and an insert part is further provided placeable on the end region of the pressing handle or insertable into the receiving means.

With the nutcracker according to the invention, the pressing is carried out only up to a certain amount so that the nuts are not completely crushed. By means of the insert part an optimal adaptation to the size of a particular nut can be made, and furthermore the aperture angle between the handles can thereby be kept always proportionally optimal. In a preferred embodiment the rear wall of the basket is closed off in order to prevent the nut from falling out when being placed in. Further preferred embodiments result from the dependent claims.

An embodiment example as well as its use will be described in the following with reference to the enclosed drawing.

Figure 1:
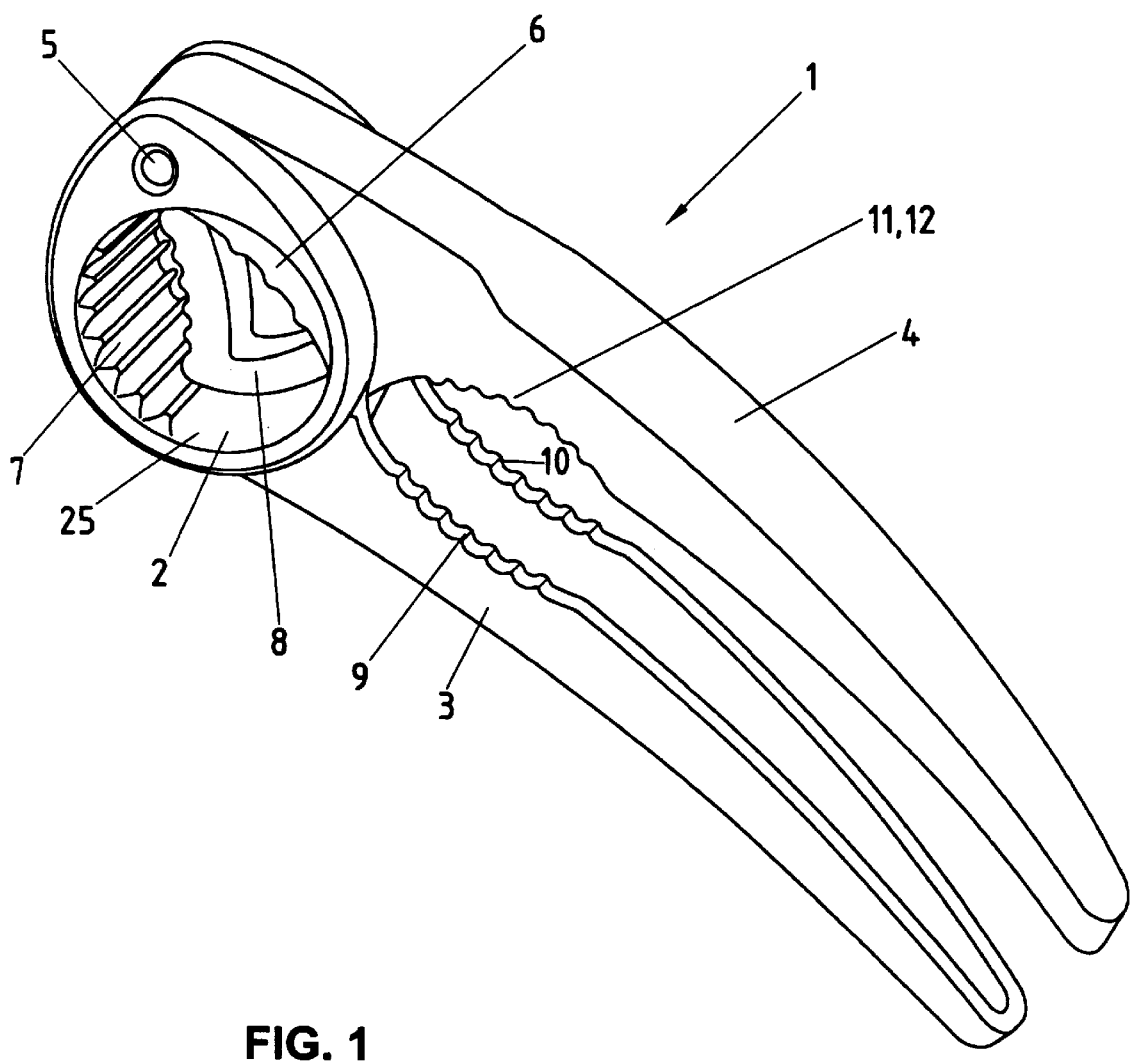
FIG. 1 is a depiction in perspective of the closed nutcracker with inserted insert part.

FIG. 1 shows the nutcracker 1 in perspective in closed state. The nutcracker comprises a handle 3, connected to a basket 2, and a pressing handle 4, disposed movable with respect to handle 3. The pressing handle 4 is disposed pivotable about a pin 5 about the basket 2, and thus pivotable about the handle 3, connected to the basket. The grooved end region 6, designed as the pressing part, cooperates with the holding ribs 7 on the basket wall 25 to open a medium-sized nut. In the case of the nutcracker according to FIG. 1, an insert part 8 to open a small nut is placed upon the end region 6 of the pressing handle 4. Provided on the inner side of the handles 3 and 4 are grooves 9, 10, 11 and 12 to open oversized nuts.

Figure 2:
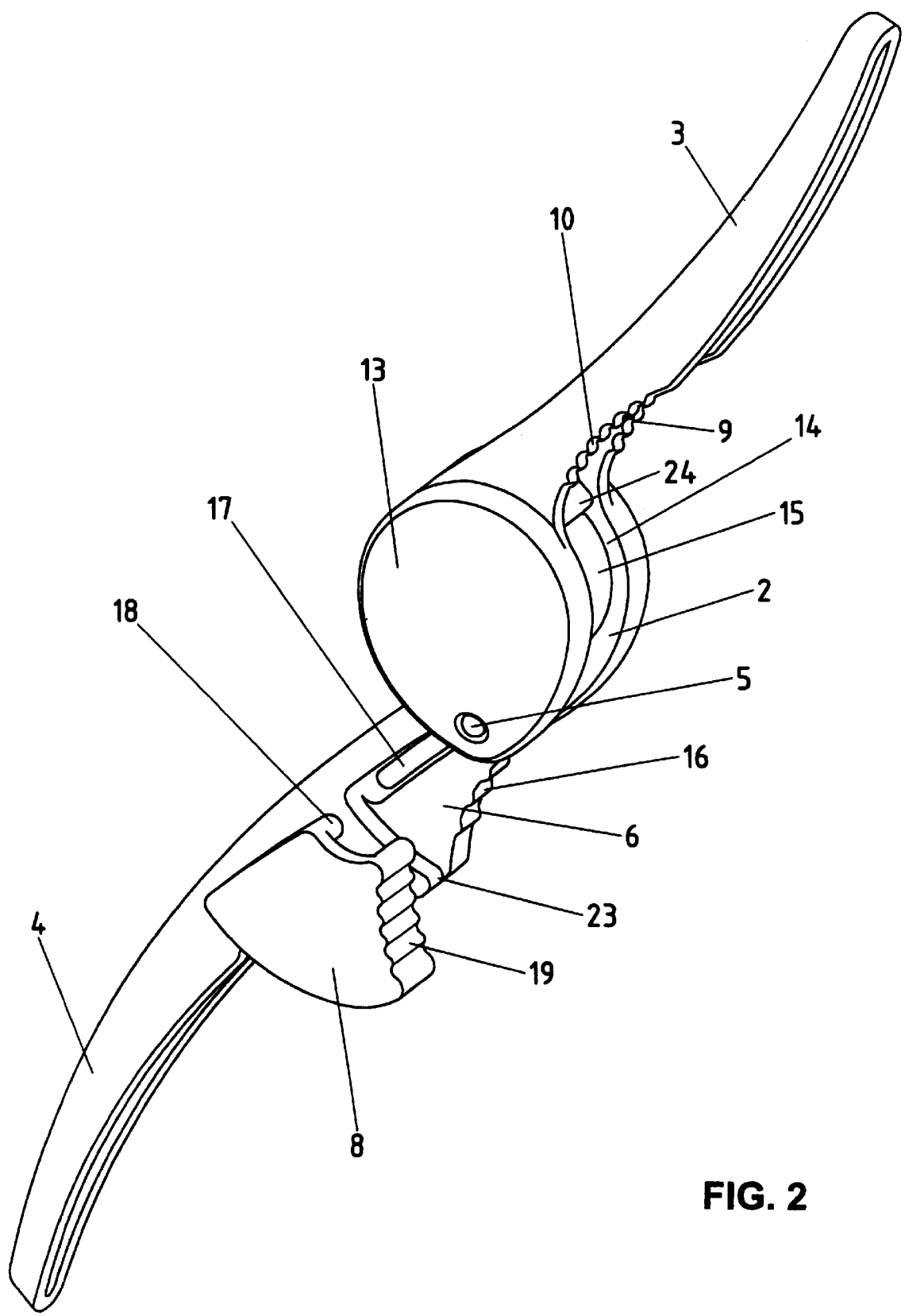
FIG. 2 shows the opened nutcracker with the insert part removed.

FIG. 2 shows the nutcracker in opened position. Located between the closed-off rear basket wall 13 and the front edge 14 of the basket 2 is an opening 15 for the pressing part 6 of the pressing handle 4. The end region 6 is provided with grooves 16. The pressing part 6 of the pressing handle 4 is provided with a slot 17 for introducing a projection 18 of the insert part 8. The insert part 8 is also provided with grooves 19, which hold the nut to be cracked. The insert part 8 is not inserted in the depiction according to FIG. 2. The pressing part 6 and the transition from the handle 3 to the basket 2 are provided with projections 23 and 24. These projections limit the distance between the pressing part and the basket wall 25 to a certain amount.

Figure 3:
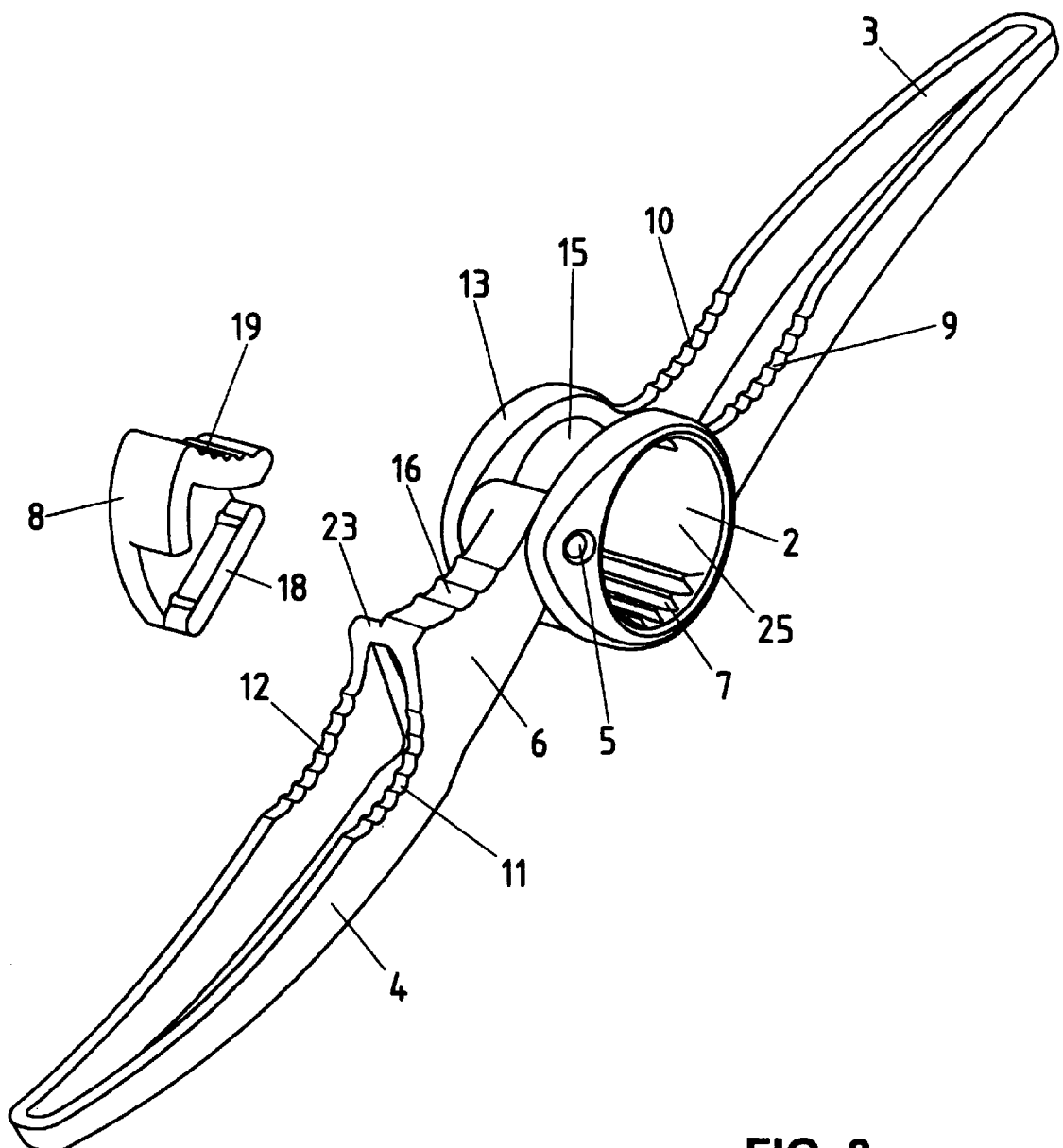
FIG. 3 shows the opened nutcracker with the insert part removed and a view of the basket aperture.

Depicted in FIG. 3 is the nutcracker in opened position with the basket 2 directed forwards. The nut to be cracked is held either between the holding ribs 7 of the basket 2 and the grooves 16 of the pressing part 6 of the pressing handle 4 or the grooves 19 of the insert part 8. It would also be possible to omit the rear wall 13 of the basket. However, with a closed-off rear basket wall 13 the nut is prevented from falling out in any case when being placed in. Moreover the spacing between the pressing part 6 of the pressing handle 4 and the basket wall 25 is selected in such a way that a crushing of the nut is not possible. Furthermore by means of the insert part an optimal adaptation to the particular size of the nut can be achieved, and moreover the aperture angle of the handles 3 and 4 can thereby be maintained always at an optimal proportion. The end region 6 or respectively the pressing part of the pressing handle 4 can run directly into the basket whereby it always rests exactly on top of the nut. A good squeezing result (opening of the nut) can thereby be achieved. The handles 3 and 4 are designed moreover with grooves 9, 10, 11, and 12 for opening oversized nuts. In addition, bottles and other containers with lids can be opened with the basket 2. When opening champagne bottles, a flying away of the cork can be prevented by the rear basket wall 13.

Figure 4:
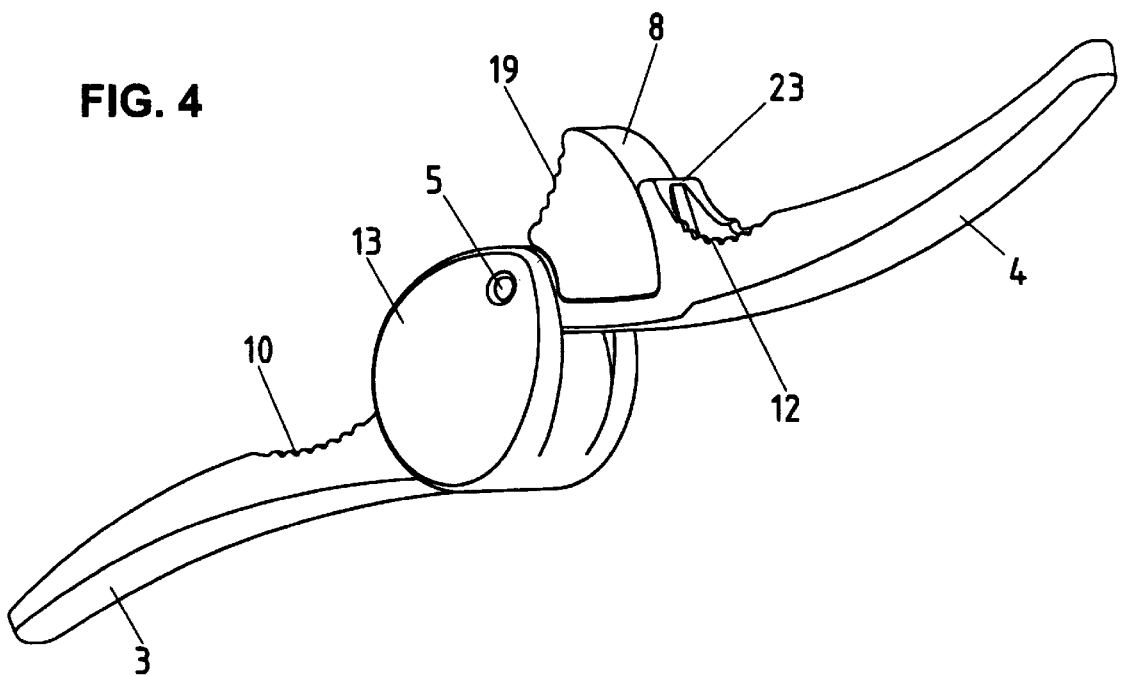
FIG. 4 shows the opened nutcracker with inserted insert part.

FIG. 4 shows the opened nutcracker with inserted insert part 8.

Figure 5:
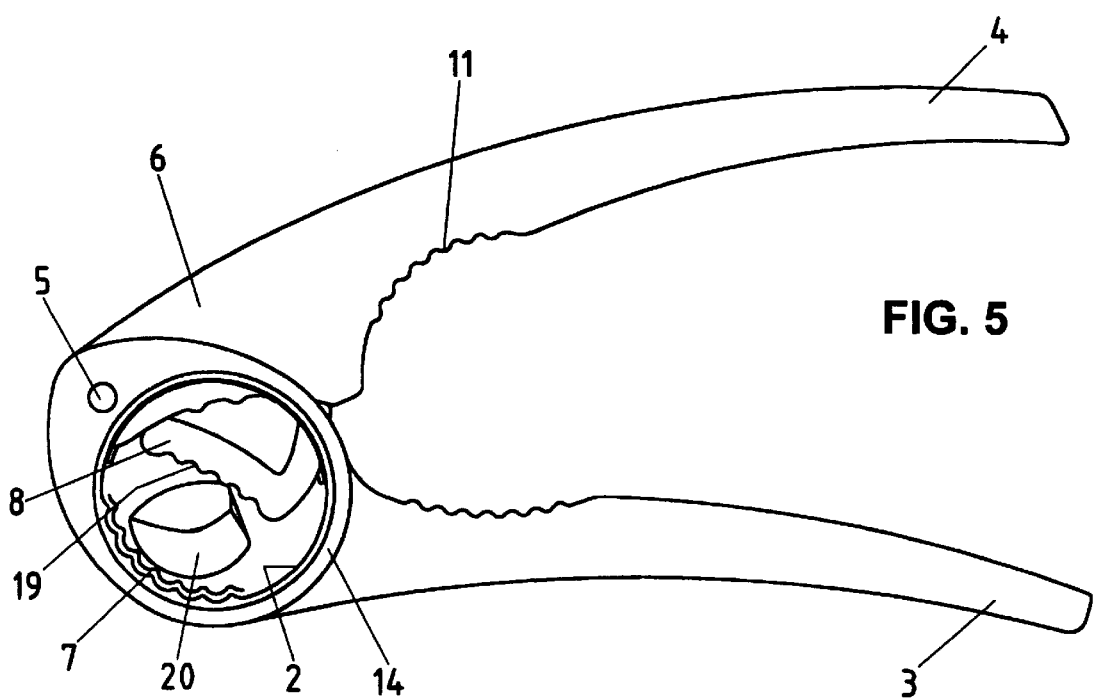
FIG. 5 shows the nutcracker with inserted insert part when cracking a small nut.

FIG. 5 shows the nutcracker with inserted insert part 8 when opening a small nut 20. The nut is thereby held between the grooves 19 of the insert part 8 and the holding ribs 7 of the basket 2.

Figure 6:
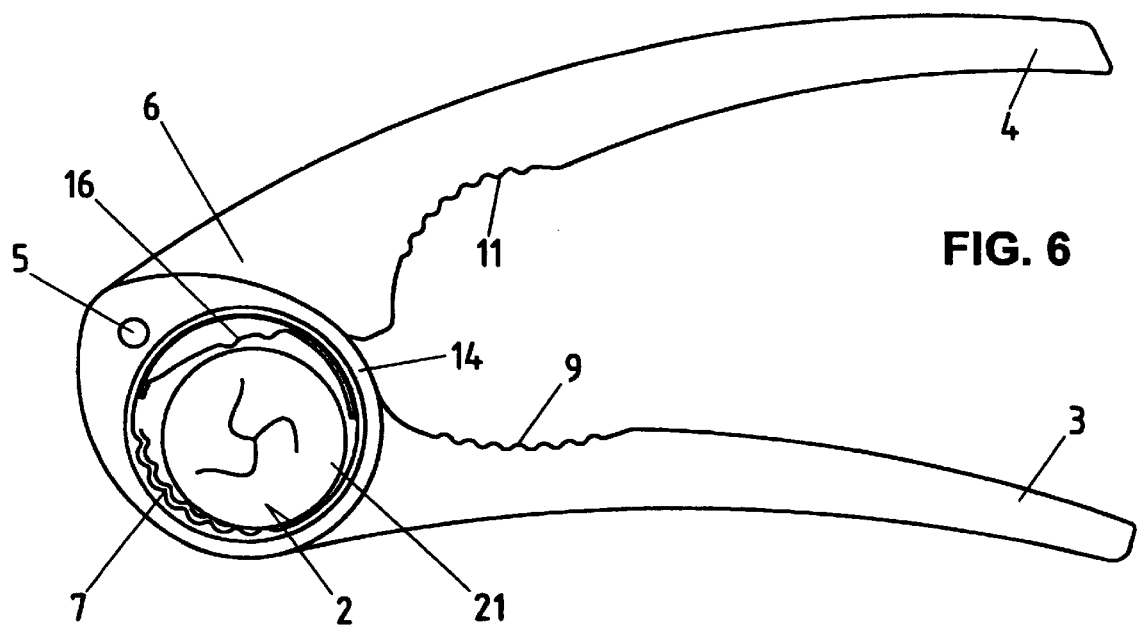
FIG. 6 shows the nutcracker without the insert part when cracking a medium-sized nut.

FIG. 6 shows the nutcracker in use when opening a medium-sized nut 21. This is held between the grooves of the pressing part 6 of the pressing handle 4 and the holding ribs 7 of the basket 2. The insert part 8 is not inserted.

Figure 7:
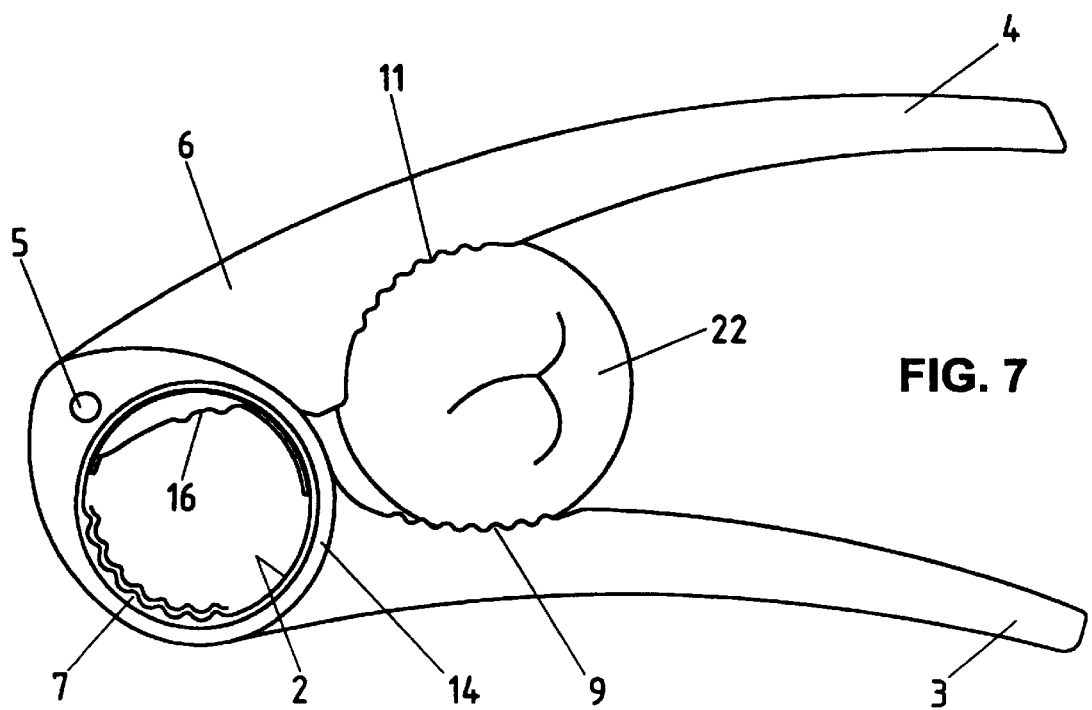
FIG. 7 shows the closed nutcracker when cracking an oversized nut between the handles.

FIG. 7 shows the nutcracker when opening an oversized nut between the grooves 9, 10, 11 and 12 in the inner region of the handles 3 and 4.

In an embodiment not shown in the drawing, a correspondingly designed insert part is not placed upon the end region of the pressing handle, but instead is placed in the receiving means, designed, for example, as a basket.

What is claimed is:

1. A nutcracker comprising:

two handles which are pivotally connected to one another at distal ends thereof;

a basket of one of the handles being configured to hold a nut, the basket having an aperture and being provided adjacent the distal end of one of said handles;

a nut pressing part of the other of said handles provided adjacent the distal end of the other of said handles, wherein the nut pressing part is configured to extend directly through the aperture and into the basket to crack a nut therein when the handles are moved toward one another; and an insert part removably mountable to one of said handles and having another nut pressing part positioned so as to extend directly through the aperture and into the basket to crack a nut therein when the insert part is mounted and the handles are moved toward one another.

2. The nutcracker according to claim 1, wherein a rear wall of the basket is closed off.

3. The nutcracker according to claim 1 or 2, wherein the basket is provided at least partially on its inside with retaining ribs.

4. The nutcracker according to claim 1, wherein the another nut pressing part is provided with retaining grooves.

5. The nutcracker according to claim 1, wherein the end region of the pressing handle is provided with a slot for introducing a projection of the insert part.

6. The nutcracker according to claim 1, wherein both handles are provided with stops in the end region.

7. The nutcracker according to claim 1, wherein the handles further include grooved recesses on their interior for receiving oversized nuts.

8. The nutcracker of claim 1, wherein said insert part is mounted to the other of said handles.

* * * * *